Oct. 10, 1961
E. G. PARKER
3,004,256
AERIAL NAVIGATION SYSTEM
Filed Oct. 17, 1958
2 Sheets-Sheet 1
Fig.1
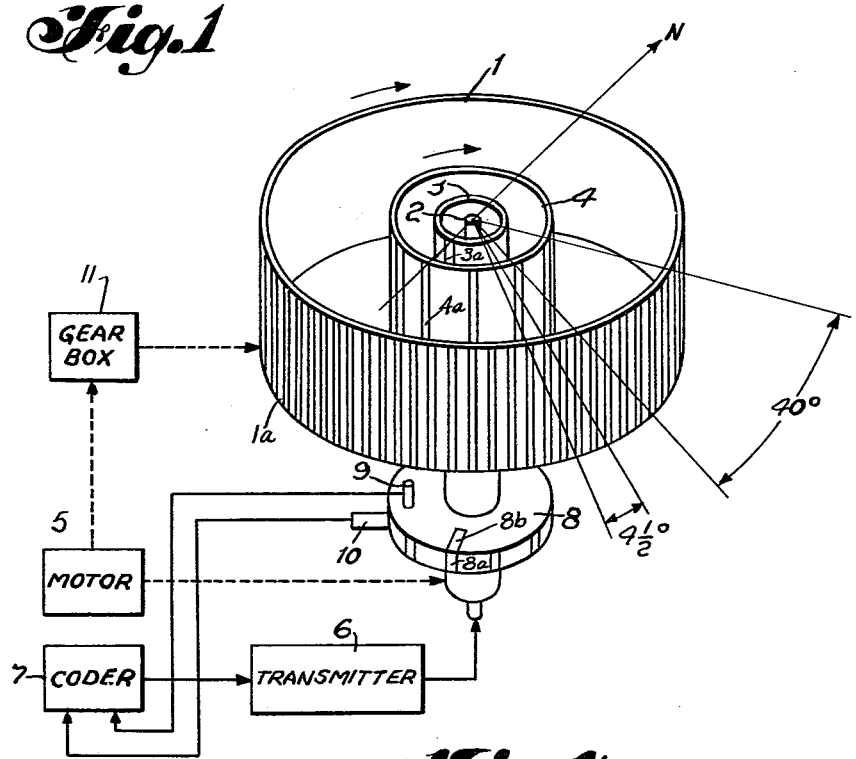
Fig.3
A 
B 
C 
D 
Inventor
ERNEST G. PARKER
By Philip M. Bolton
Attorney

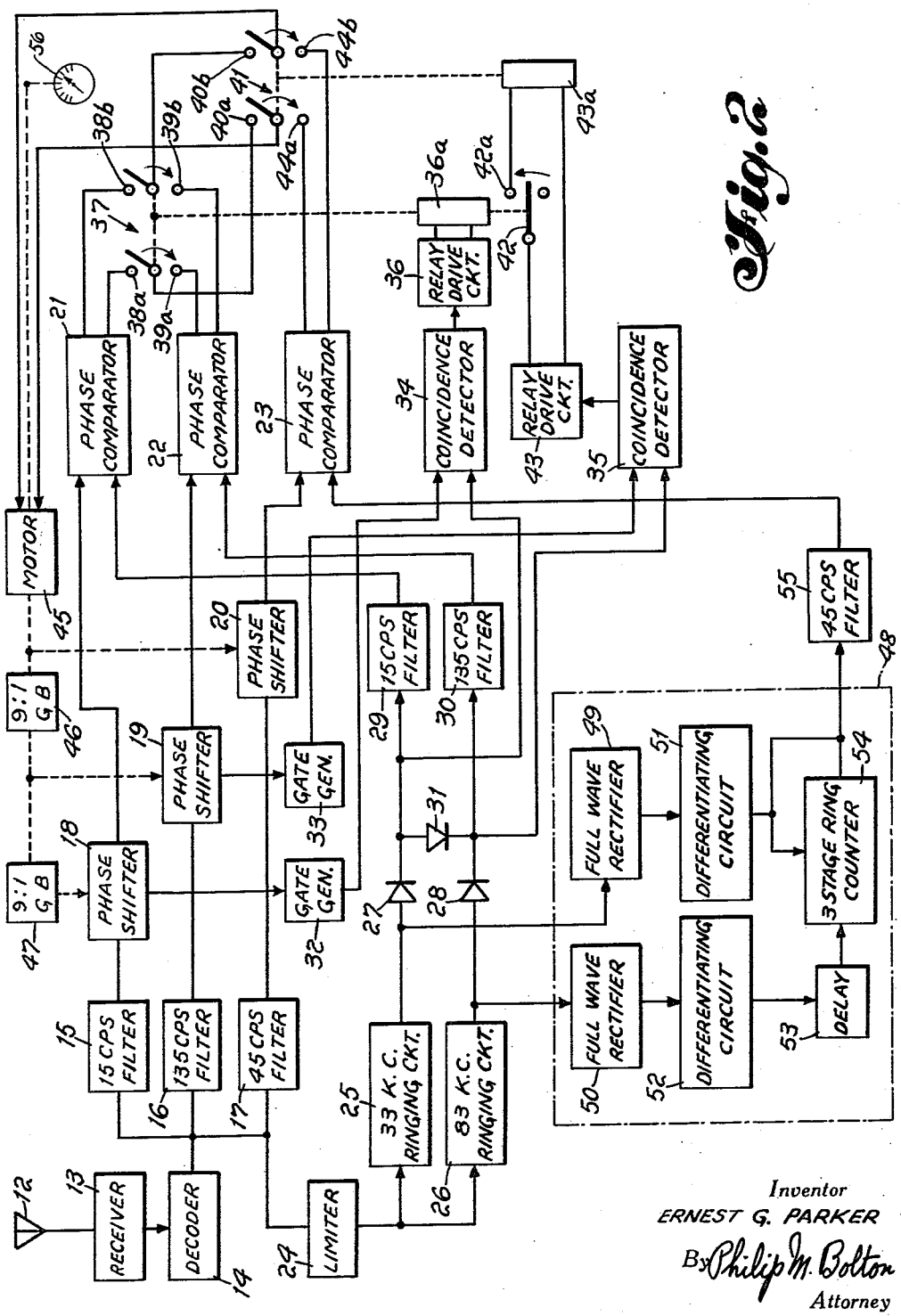

United States Patent Office 3,004,256
Patented Oct. 10, 1961

3,004,256
AERIAL NAVIGATION SYSTEM
Ernest G. Parker, Morristown, N.J., assignor to International Telephone and Telegraph Corporation, Nutley, N.J., a corporation of Maryland
Filed Oct. 17, 1958, Ser. No. 767,864
10 Claims. (Cl. 343—106)

This invention relates to aerial navigation systems and more particularly to an improved system of the Tacan type having an additional modulation to the beacon signal associated therewith to yield finer bearing resolution.

The Tacan aerial navigation system, described in considerable detail in volume 33 of the March 1956 edition of "Electrical Communication," the technical journal of the International Telephone and Telegraph Corporation and associate companies, consists essentially of a beacon transmitting a radiation pattern having a single fundamental lobe with nine harmonic lobes superimposed thereon, the complete pattern being rotated at a constant speed. Meanwhile, the antenna emits radiation in pairs of bursts of RF signal and receiving equipment onboard a vehicle receives the transmitted beacon signals and feeds decoding and computing circuits for computing the bearing of the vehicle relative to the beacon. Tacan aerial navigation systems are also described in patent applications 705,964, now Patent No. 2,912,690, and 726,463, now Patent No. 2,912,691, both by M. Mandel, filed December 30, 1957 and April 4, 1958, respectively. In the Tacan system described in the reference, the beacon antenna pattern is rotated at 15 c.p.s. and each time the main lobe sweeps through a given direction, such as for example, north, the spacing between the pairs of bursts of RF signal is altered during a brief interval. Also, as each of the nine harmonic lobes sweep past the north direction the spacing between pairs of bursts is altered in another manner for a brief interval. The different combinations of pulse pairs transmitted during these brief intervals are referred to as the main reference pulse signal and auxiliary reference pulse signals, respectively. Consequently, upon comparing, at the receiver onboard the vehicle, the phase between the main pulse signal and the fundamental lobe and the phase between the auxiliary pulse signals and the ninth harmonic lobes, signals indicative of coarse bearing and fine bearing from the vehicle to the beacon can be derived.

Upon examination of the details of the Tacan system presented in the reference it is evident that a still finer indication of bearing from the vehicle to the beacon could be obtained by modulating the pulse pairs by a still higher harmonic signal. For example, the 18th or 27th or 36th or even 81st harmonic lobes could be superimposed on the radiation pattern and additional reference pulse signals supplied for each of these lobes to yield finer bearing resolution at the vehicle. Obviously, the addition of these higher harmonic lobes to the antenna pattern and the addition of associated reference pulses would require a more complex transmitter and associated coder unit as well as a more complex beacon antenna than is presently employed in the Tacan system described in the reference. If higher harmonic lobes were superimposed on the antenna pattern as described above and the composite pattern rotated at a constant speed and higher harmonic reference pulse signals transmitted in addition to the existing main and auxiliary reference pulse signals for the existing fundamental and ninth harmonic antenna lobes, then additional means would be required in the airborne bearing circuits for detecting the higher harmonic reference pulse signals, detecting the higher harmonic waveform and for comparing the results of these detections.

It is an object of this invention to improve bearing resolution in the Tacan aerial navigation system.

It is another object to add higher harmonic lobes to the Tacan beacon antenna pattern whereby improved bearing resolution may be achieved in the Tacan airborne bearing system.

It is another object to add higher harmonic lobes to the Tacan beacon antenna pattern and to employ the already existing reference pulse signals detected in the Tacan airborne equipment for phase comparison with the modulating signal produced by the rotation of said higher harmonic lobes to yield improved bearing resolution.

It is another object to alter the Tacan beacon and Tacan airborne equipment so that higher harmonic lobes are added to the beacon antenna pattern and rotated, yielding an additional modulating signal which is employed in Tacan airborne bearing determining circuits to yield higher bearing resolution requiring a minimum amount of additional equipment and changes to the existing Tacan beacon and airborne equipment, such changes and additions to the beacon being such that existing Tacan airborne equipment may still continue to employ signals from said beacon with no loss of bearing accuracy.

It is a feature of this invention to superimpose higher harmonic lobes on the existing Tacan beacon antenna pattern by employing additional parasitic reflecting elements orientated on a circle in the same manner as the existing parasitic elements, said circle being concentric with the driven radiator of said beacon and having a predetermined diameter considerably larger than the diameter at which the existing parasitic reflectors are located.

It is another feature of this invention to rotate the additional parasitic radiating elements at a slower speed about the driven member than the existing parasitic elements are rotated about said driven member.

It is another feature of this invention to rotate the additional parasitic elements at a speed which is slower, for example one-twenty-seventh the speed at which the existing parasitic elements are rotated in the existing Tacan beacon, thus adding higher harmonic lobes to the existing Tacan beacon antenna pattern for example, the 81st harmonic which is detected as the airborne receiver as a low frequency modulating waveform, such as a 45 c.p.s. waveform.

It is another feature to select predetermined ones of the reference pulse signals detected in the bearing circuits of the existing Tacan airborne system and phase compare said preselected pulse signals with said low frequency (45 c.p.s.) modulating waveform to yield a fine bearing signal more sensitive than bearing signals produced in existing Tacan airborne bearing circuits.

It is another feature to select every main reference pulse signal and predetermined ones, such as every third auxiliary reference pulse signal, and to combine and filter these selected pulse signals to yield a low frequency (45 cycle) sine wave which is then phase compared with a phase shifted low frequency (45 cycle) modulation waveform detected by the airborne receiver to yield an error signal for driving the phase shifter as well as a bearing indicator so as to indicate bearing with improved resolution over the existing Tacan system described in the reference.

Other features and objects of this invention will be more apparent from the following specific description of an embodiment taken in conjunction with the drawings in which:

FIG. 1 depicts an improved Tacan beacon antenna and associated parts of a Tacan beacon for producing 81st harmonic lobes in the beacon antenna pattern;

FIG. 2 is a block diagram of the Tacan airborne receiver and bearing circuits including the additional equipment required to yield bearing resolution employing the 45 c.p.s. modulation waveform produced by rotation of the 81st harmonic lobes of the beacon antenna pattern;

FIG. 3 depicts waveforms from which to better understand the operation of the system shown in FIG. 2.

Turning first to FIG. 1 there is shown a Tacan beacon antenna such as described in the reference entitled "Electrical Communication" having additional parasitic elements supported by a cylinder 1 of dielectric material, said cylinder being preferably concentric with the driven element or central radiator 2 of said antenna and having a diameter of approximately 25 feet. Vertically disposed parasitic elements 1a are supported by dielectric cylinder 1, these elements being separated from each other by an angle of approximately 4.5 degrees. Other components of the antenna described in the reference include cylinders 3 and 4, cylinder 3 supporting a single parasitic element 3a and cylinder 4 supporting nine spaced parasitic elements 4a separated from each other by approximately 40 degrees as shown in the FIG. 1. As described in the reference, cylinders 3 and 4 are driven to rotate about their common axis at a speed of 15 c.p.s. by drive motor 5 and the electrically driven element 2 is energized by transmitter 6 controlled by coder unit 7 which, is in turn synchronized to the rotation of the cylinders by a synchronizing unit such as shown in the figure. This synchronizing unit is fully described in the reference and might for example consist of a disk 8 having conductive portions 8a and 8b on its edge and top respectively which are angularly spaced to align with parasitic elements supported by cylinders 4 and 3 respectively and intermittently make contact with brushes 9 and 10 which are coupled to coder 7. Brushes 9 and 10 are located so as to mark the position of the parasitic elements in cylinders 3 and 4 respectively with reference to some predetermined direction, for example north, thereby determining the interval during which characteristic bursts of pairs of pulses from transmitter 6 representative of the main reference pulse signal and the auxiliary reference pulse signals will occur. Motor 5 serves to rotate cylinders 3 and 4 each at 15 c.p.s. in the same direction about driven element 2 as also described in the reference. In this invention, motor 5 also serves to drive cylinder 1 in the same direction as cylinders 3 and 4 are rotated, however, at approximately 1/27 the speed, the reduction in speed being achieved by the action of gear box 11.

Turning next to FIG. 2 there is shown the Tacan airborne receiver and bearing circuits operating in a manner essentially as described in the reference entitled "Electrical Communication." This equipment consists of an antenna 12 coupled to a receiver 13 whose output, consisting of amplitude modulated pulse pairs, a predetermined separation between pairs serving to indicate reference pulse signals, is decoded by decoder 14. The output of decoder 14, consisting of single pulses each representative of a pulse pair, is fed to filters 15, 16 and 17 which detect from the modulation envelope of the pulses, the 15 c.p.s., 135 c.p.s. and 45 c.p.s. components thereof respectively. It should be noted that modulation by the rotating 81st harmonic lobes of the antenna pattern are detected as a 45 c.p.s. component by 45 c.p.s. filter 17. This is evident when it is considered that the 81 parasitic reflectors supported by cylinder 1 forming the beacon antenna shown in FIG. 1 is rotated at the rate of 15/27 of a cycle per second which is equal to 45 c.p.s. electrically and is merely the third electrical harmonic of the fundamental 15 c.p.s. modulation component. The output of filters 15, 16 and 17 are phase shifted by phase shifters 18, 19 and 20 and fed to phase comparator circuits 21, 22 and 23.

Meanwhile, the output of decoder 14 is also fed to limiter circuit 24 which clips all pulses to the same level and the output of limiter 24 is applied to damped 33 kc. ringing circuit 25 and damped 83 kc. ringing circuit 26.

Ringing circuits 25 and 26 serve to detect the main reference pulse signals and the auxiliary reference pulse signals respectively in much the same manner as described in the reference applications. The outputs of ringing circuits 25 and 26 are fed via diodes 27 and 28 to 15 cycle filter 29 and 135 cycle filter 30 respectively, these diodes serving to rectify the outputs of the ringing circuits. Diodes 31, coupling the input to filter 29 to the input of filter 30, serves to feed the rectified output from ringing circuit 25 to filter 30 to fill in every ninth auxiliary reference pulse signal, thus providing a continuous string of pulses at a rate of 135 per second to filter 30, as shown in waveform A of FIG. 3. The outputs of filters 29 and 30 are 15 and 135 c.p.s. sine waves, respectively, and are fed to phase comparator circuits 21 and 22, respectively, wherein they are modulating components from phase shifters 18 and 19 phase compared with the phase shifted 15 and 135 cps respectively. Phase shifters 18 and 19 also feed gate pulse generators 32 and 33, respectively, and each of these gates generate pulses 40 degrees wide. In the case of gate generator 32, the 40 degree wide pulse generated is 40 degrees of each cycle of the 15 c.p.s. component and in the case of gate generator 33, the 40 degree wide pulse generated is 40 degrees of each cycle of the 135 c.p.s. component. Thus, the duration of each pulse output from generator 32 is nine times as long as the duration of each pulse output from generator 33. Gate generators 32 and 33 feed pulses to coincidence detector circuits 34 and 35, respectively, wherein the gate pulses are coincidence compared with the pulse signals from diodes 27 and 28 representing the main and auxiliary reference pulse signals, respectively. Consequently, when the main reference pulse signal is in coincidence with the 40 degree wide pulse from generator 32, coincidence detector 34 feeds pulses to solenoid drive circuit 36 which energizes solenoid 36a which in turn controls double pole double throw switch 37 causing the arms of that switch to disengage from terminals 38a and b and contact terminals 39a and b and as a result, the output from phase comparator 22, rather than phase comparator 21, is fed to terminals 40a and b of double pole double throw switch 41. When energized, solenoid 36a also actuates normally open switch 42 causing the arm of that switch to contact terminal 42a applying the output of solenoid drive circuit 43 to solenoid 43a. Thus, solenoid 43a is energized when each 40 degree wide gate pulse from gate generator 33 is in coincidence with an auxiliary reference pulse signal output from diode 28. When energized, solenoid 43a actuates double pole double throw switch 41 causing the arms of that switch to disengage from terminals 40a and 40b and to engage terminals 44a and 44b applying the output of phase comparator circuit 23, rather than the output of phase comparator 22, to motor 45. Motor 45 serves to drive phase shifters 18, 19 and 20, phase shifter 19 being driven by motor 45 via nine to one ratio gear box 46 and phase shifter 18 being driven via nine to one gear boxes 46 and 47 which are in series.

The purpose of pulse selector device 48 is to select every main reference pulse signal and every third auxiliary reference pulse signal following a main reference pulse signal and to combine these selected pulse signals producing at its output evenly spaced pulses at a rate of 45 per second. In order to accomplish this the 33 kc. and 83 kc. bursts representing main and auxiliary reference pulse signals from ringing circuits 25 and 26, respectively, are applied to full wave rectifiers 49 and 50 respectively. Rectifiers 49 and 50 produce essentially square pulses, one pulse for each burst of signal from their associated ringing circuits and these square pulses are differentiated by differentiating circuits 51 and 52 coupled to the output of rectifiers 49 and 50, respectively. The positive spike resulting from the differentiating action of circuit 52 is delayed a predetermined amount by delay 53 and fed to three stage ring counter 54 while the positive spike resulting from the differentiating action of circuit 51 is applied to ring counter 54 serving to clear that counter. Since the output of ring counter 54 is also applied to clear the counter as well as the undelayed positive spike from differentiating circuit 51, the output from pulse selector circuit 48 will consist of a pulse coincident with the front edge of each main reference pulse signal followed by pulses coincident with the front edge of each third auxiliary reference pulse signal following a fundamental pulse signal and this output is fed to 45 c.p.s. filter 55. The output of filter 55 is fed to phase comparator circuit 23 where it is phase compared with the phase shifted 45 c.p.s. modulating component output from filter 17.

It should be noted that in operation only one of the phase comparator circuits 21, 22 or 23 energize motor 45 at any one time, the scheduling of this control being accomplished in part by coincidence detectors 34 and 35 through their control of switches 37, 41 and 42. In normal operation, commencing from the condition where the main reference pulse is not in coincidence with the 40 degree wide gate pulse from gate generator 32, the arms of switch 37 will be in contact with terminals 38a and 38b, the arms of switch 41 will be in contact with terminals 40a and 40b and switch 42 will be open; thus the output from phase comparator 21 will energize motor 45 driving phase shifters 18, 19 and 20 until the 40 degree wide pulses from gate generator 32 are moved into coincidence with main reference pulse signals. Upon achieving such coincidence, solenoid 36 will be energized positioning the arms of switch 37 to terminals 39a and 39b and closing switch 42; thus motor 45 will be energized by the output of phase comparator 22 and solenoid 43a will be ready for energization by the output from drive circuit 43 in response to the output from coincidence detector 35. Thereafter, when the gate pulses from gate generator 33 are in coincidence with auxiliary reference pulses, coincidence detector 35 will energize solenoid 43a switching the arms of switch 41 to terminals 44a and 44b so as to energize motor 45 by the output from phase comparator circuit 23 and motor 45 will continue to be energized by phase comparator circuit 23 so long as main reference pulse signals are coincident with the gate pulses from gate generator 32 and auxiliary reference pulse signals are coincident with the gate pulses from gate generator 33. Thereupon, indicator 56 will indicate very fine bearing from antenna 12 to the Tacan beacon shown in FIG. 1.

While there is described above the principles of this invention in connection with specific apparatus, it is to be understood that this description is made only by way of example and not as a limitation on the scope of the invention as set forth in the objects and accompanying claims.

I claim:

1. An aerial navigation system comprising beacon means at one location for radiating signals in a first rotating directional pattern rotating at a given rate, means for superimposing on said first rotating directional pattern a second rotating directional pattern rotating at another rate, means to transmit reference signals when said first pattern and said second pattern are directed in at least one given direction, signal detecting and receiving means at another location having means to detect the modulations of said beacon signals due to said rotations and means to detect said reference signals and means coupled to said modulation and reference signal detecting means for comparing said modulations with said reference signals to yield signals indicative of bearing.

2. An aerial navigation system comprising beacon means at one location for radiating signals in a first rotating directional pattern rotating at a given rate, means for superimposing on said first rotating directional pattern a second rotating directional pattern rotating at another rate, means to transmit reference signals when said first pattern and said second pattern are directed in at least one given direction, signal detecting and receiving means at another location having means to detect the modulations of said beacon signals due to said rotations and means to detect said reference signals and means coupled to said modulation and reference signal detecting means for phase comparing said modulations with said reference signals to yield signals indicative of bearing.

3. An aerial navigation system comprising beacon means at one location for radiating signals in a first rotating directional pattern rotating at a given rate, means for superimposing on said first rotating directional pattern a rotating multi-lobed directional pattern rotating at another rate, means to transmit reference signals when said first pattern and said lobes are directed in at least one given direction, signal detecting and receiving means at another location having means to detect the modulations of said beacon signals due to said rotations and means to detect said reference signals and means coupled to said modulation and reference signal detecting means for phase comparing said modulations with said reference signals to yield signals indicative of bearing.

4. An aerial navigation system comprising beacon means at one location for radiating signals in a first rotating directional pattern rotating at a given rate, means for superimposing on said first rotating directional pattern a multi-lobed directional pattern rotating at another rate, means to transmit reference signals when said first pattern and said lobes are directed in at least one given direction, signal detecting and receiving means at another location having means to detect first modulations due to the rotation of said first pattern, means to detect second modulations due to the rotation of said multi-lobed pattern and means to detect said reference signals and means coupled to said modulation and reference signal detecting means for phase comparing said first modulations with one selection of said reference signals and for phase comparing said second modulations with another selection of said reference signals to yield signals indicative of coarse and fine bearing from said beacon to said signal detecting means.

5. An aerial navigation system comprising beacon means at one location for radiating signals in a first rotating directional pattern rotating at a given rate, means for superimposing a multilobed directional pattern upon said first directional pattern, means to rotate said multi-lobed directional pattern at another rate, means to alter said signals when said first rotating pattern and said lobes are directed in a given direction, signal detecting and receiving means at another location having means to detect first modulations due to the rotation of said first pattern, second modulations due to the rotation of said second pattern and said altered signals and means coupled to said modulation and altered signal detecting means for phase comparing said first modulations with one selection of said altered signals and for phase comparing said second modulations with another selection of said altered signals to yield signals indicative of coarse and fine bearing from said beacon to said signal detecting means.

6. An aerial navigation system comprising beacon means at one location for radiating signals in a first rotating directional pattern rotating at a given rate, means for superimposing a multi-lobed directional pattern upon said first directional pattern, means to rotate said superimposing means at another rate, means to alter said signals when said first rotating pattern and said lobes are directed in at least one given direction, signal detecting and receiving means at another location having means to detect first modulations due to the rotation of said first pattern, second modulations due to the rotation of said second pattern and said altered signals and means coupled to said modulation and altered signal detecting means for phase comparing said first modulations with a selection of said altered signals and for phase comparing said second modulations with another selection of said altered signals to yield signals indicative of coarse and fine bearing from said beacon location to said other location.

7. An aerial navigation system comprising beacon means at one location for radiating signals in a first rotating directional pattern rotating at a given rate, means for superimposing a multi-lobed directional pattern upon said first directional pattern, means to rotate said superimposing means at a slower rate, means to alter said signals when said first rotating pattern and said lobes are directed in a given direction, signal detecting and receiving means at another location having means to detect first modulations due to the rotation of said first pattern, second modulations due to the rotation of said second pattern and said altered signals and means coupled to said modulation and altered signal detecting means for phase comparing said first modulations with one selection of said altered signals and for phase comparing said second modulations with another selection of said altered signals to yield signals indicative of coarse and fine bearing from said beacon location to said other location.

8. An aerial navigation system comprising beacon means at one location for radiating pulsed signals in a first rotating directional radiation pattern rotating at a given rate, means for superimposing a multi-lobed directional radiation pattern upon said first directional pattern, means to rotate said multi-lobed directional pattern at another rate, means to alter the spacing between said pulsed signals when said first rotating pattern and said lobes are directed in a given direction thereby producing reference signals, signal detecting and receiving means at another location having means to detect first modulations due to the rotation of said first pattern, second modulations due to the rotation of said multi-lobed pattern and said reference signals, phase shifting means coupled to said modulation detecting means, means coupled to said phase shifting means for phase comparing said first modulations with one selection of said reference signals and for phase comparing said second modulations with another selection of said reference signals, drive means coupled to said phase shifting means to phase shift said first and second modulations, and means coupling the output of said phase comparing means to said drive means so that said drive means indicates the bearing of said other location relative to said beacon location.

9. An aerial navigation system including a beacon at one location for radiating pulses in a first rotating directional radiation pattern having fundamental and harmonic lobes, means for rotating said first pattern at a given rate, a plurality of antenna elements disposed in said rotation pattern, means to move said plurality of elements to modulate said radiation, said motion being different from the rotation of said first pattern, means to alter the spacing between said pulsed signals when said fundamental and said harmonic lobes of said first pattern are directed in a given direction, signal detecting and receiving means at another location having means to detect first modulations due to the rotation of said fundamental lobe, second modulations due to the rotation of said first harmonic lobes, third modulations due to the movement of said plurality of elements and said altered pulses, means coupled to said detecting means for phase comparing said first modulations with a first selection of said altered signals, for phase comparing said second modulations with a second selection of said altered signals and for phase comparing said third modulations with a third selection of said altered signals to yield signals indicative of coarse, fine and very fine bearing from said beacon location to said other location.

10. An aerial navigation system including a beacon at one location transmitting signals to receiving equipment at another location, said beacon comprising means for transmitting pulse radiation in a rotating antenna pattern having a fundamental directional lobe and at least one plurality of harmonic directional lobes, means coupled to said transmitting means for rotating said pattern, means for transmitting a first reference signal each time said fundamental lobe passes a given direction and a second reference signal each time one of said harmonic lobes passes a given direction, a plurality of antenna elements disposed in said pattern, means to support said elements, means to move said support in a predetermined manner so as to modulate said radiation; and said receiving equipment comprising a receiver, a decoder coupled to the output of said receiver, means coupled to the output of said decoder for separating said first reference signal, said second reference signal, a fundamental modulating waveform, a harmonic modulating waveform and the modulating waveform produced by said antenna elements, phase shifting means coupled to said separating means for shifting the phase of said waveforms, means coupled to said separating means for selecting predetermined first reference and second reference signals, means coupled to the output of said phase shifting means, said selector means and said separating means for phase comparing said first reference signal with said fundamental waveform, said second reference signal with said harmonic waveform and said selected reference signals with said modulating waveform produced by said antenna elements, motor means coupled to said phase shifting means and switching means coupling the outputs of said phase comparing means to said motor means in a predetermined manner whereby the shaft position of said motor when driven to a null represents the bearing from said receiving equipment to said beacon.

References Cited in the file of this patent

UNITED STATES PATENTS 2,815,507    De Faymoreau _____ Dec. 3, 1957